United States Patent [19]
Bush

[11] 3,785,660
[45] Jan. 15, 1974

[54] SEAL
[75] Inventor: Jack A. Bush, Livonia, Mich.
[73] Assignee: Republic Industrial Corporation, New York, N.Y.
[22] Filed: Oct. 15, 1970
[21] Appl. No.: 81,149

Related U.S. Application Data
[62] Division of Ser. No. 661,031, Aug. 10, 1967, abandoned.

[52] U.S. Cl. ............................................. 277/134
[51] Int. Cl. .......................... F16j 15/54, F16j 9/00
[58] Field of Search ..................................... 277/134

[56] References Cited
UNITED STATES PATENTS
3,534,969   10/1970   Weinand .......................... 277/134 X
FOREIGN PATENTS OR APPLICATIONS
888,198   1/1962   Great Britain ....................... 277/134

OTHER PUBLICATIONS
Helixseal – by L. H. Weinand, paper No. 67-WA/LUB 8, pages 4–10, June 7, 1967.
Research Publication GMR-532 – "Application of Hydrodynamic Principles in Sealing" by L. H. Weinand, p. 51, Sept. 30, 1965.

Primary Examiner—Samuel B. Rothberg
Attorney—Harness, Dickey & Pierce

[57] ABSTRACT

The disclosure relates to oil seals having helical fluid impellers thereon, which are known in the art as hydrodynamic seals. In such seals helical impellers on the air side of the seal converge with the direction of rotation of a shaft. Oil which leaks past the seal is deflected or "pumped" back to the oil side of the seal by the fluid impellers.

2 Claims, 19 Drawing Figures

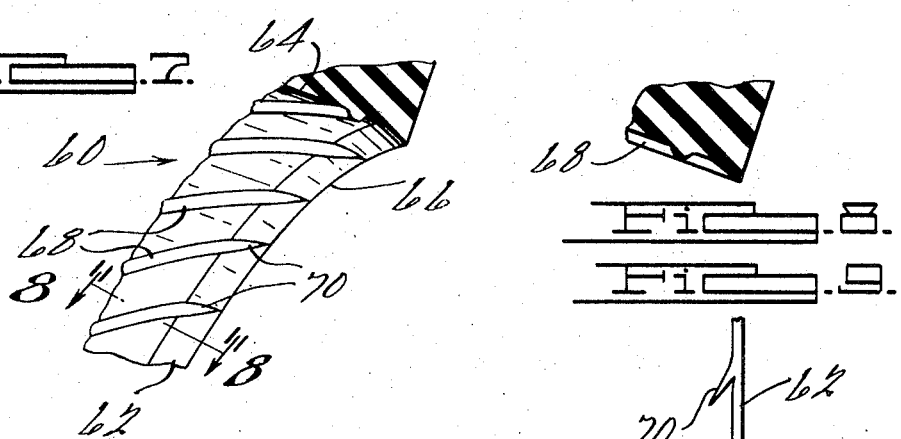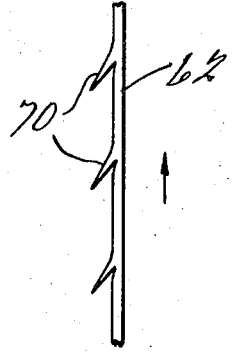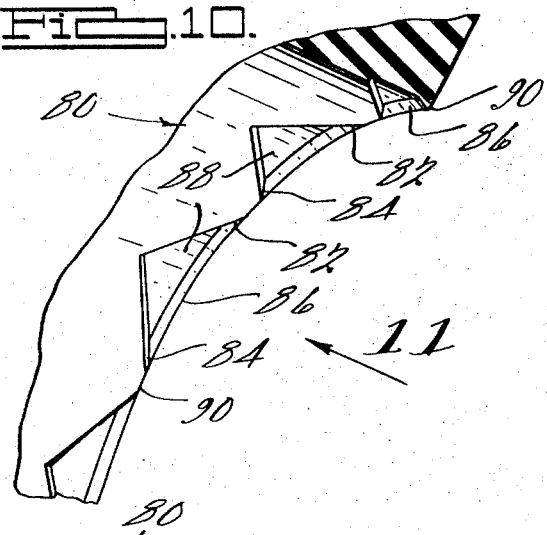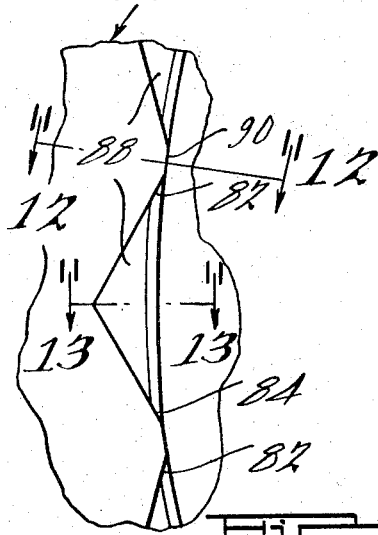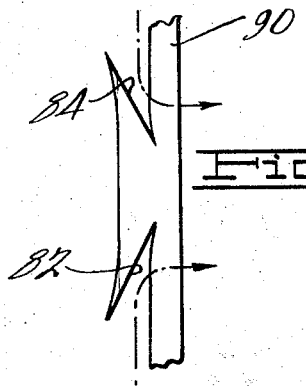

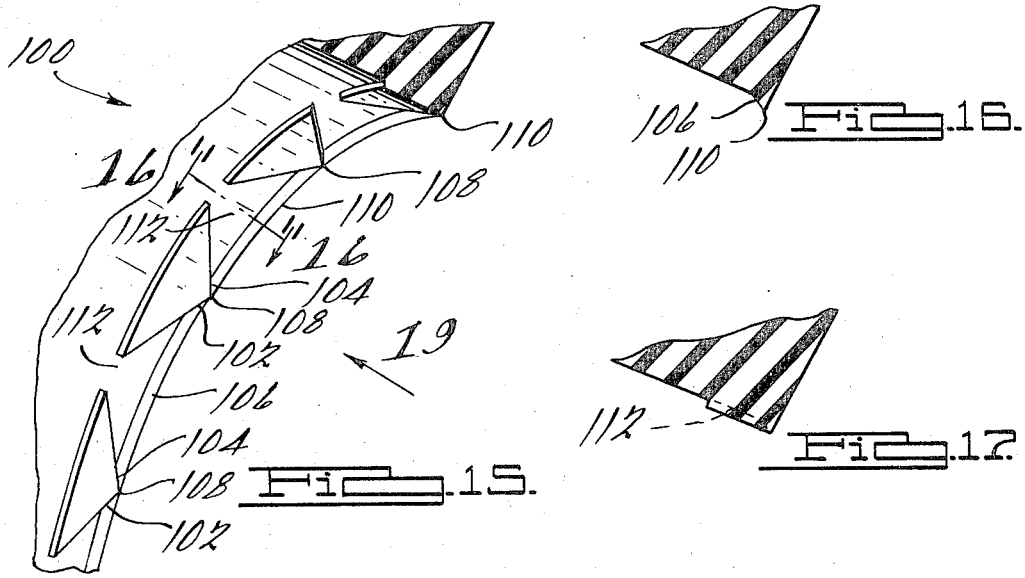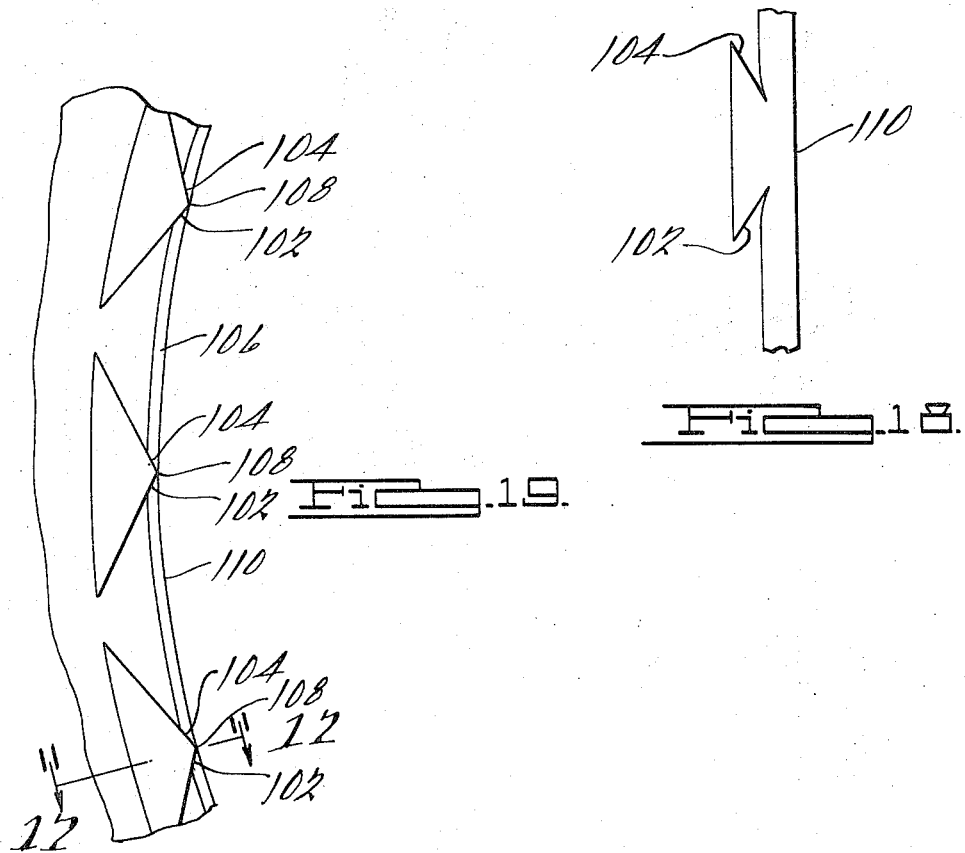

3,785,660

SEAL

This application is a division of application Ser. No. 661,031, filed Aug. 10, 1967, and now abandoned.

BACKGROUND OF THE INVENTION

Hydrodynamic seals heretofore known and used characteristically employ fluid impellers which extend axially across the area of contact between the seal and a shaft. This construction either results in static oil leakage or necessitates the use of a relatively strong spring to radially compress the seal against the shaft in order to preclude static leakage. However, an ideal seal has a sealing edge which is lightly engaged against a shaft, in what may be termed line contact, so that a thin film of oil forms between the shaft and the sealing edge.

Accordingly, the object of the present invention is an improved hydrodynamic seal that precludes static oil leakage and closely approaches an ideal seal.

SUMMARY OF THE INVENTION

In accordance with the instant invention, a hydrodynamic seal is provided with a static lip which has a generally conical annular radially inner surface that extends toward the shaft at an angle and which, when the seal is in operative position, terminates in a relatively narrow smooth uninterrupted sealing edge. The helical fluid impellers extend across the air side of the static lip and blend into contiguous relation with the sealing edge thereof.

DESCRIPTION OF THE DRAWINGS

FIG. 7 is a fragmentary perspective view partly in section illustrating a modified form of the invention.

FIG. 8 is a fragmentary sectional view taken along the line 8—8 of FIG. 7.

FIG. 9 is a diagrammatic flat development illustrating the region of contact between a shaft and the seal of FIG. 7.

FIG. 10 is a fragmentary perspective view partly in section of another modified form of the invention.

FIG. 11 is a fragmentary elevational view in the direction of arrow 11 in FIG. 10.

FIG. 12 is a sectional view on line 12—12 of FIG. 11.

FIG. 13 is a sectional view on line 13—13 of FIG. 11.

FIG. 14 is a diagrammatic flat development illustrating the region of contact between a shaft and the seal of FIG. 10.

FIG. 15 is a fragmentary perspective view, partly in section, of another modified form of the invention.

FIG. 16 is a sectional view on line 16—16 of FIG. 15.

FIG. 17 is a sectional view on line 17—17 of FIG. 19.

FIG. 18 is a diagrammatic flat development illustrating the region of contact between a shaft and the seal of FIG. 15.

FIG. 19 is a view taken in the direction of arrow 19 in FIG. 15.

DESCRIPTION OF THE PREFERRED EMBODIMENTS

Figures 1, 2, 5:
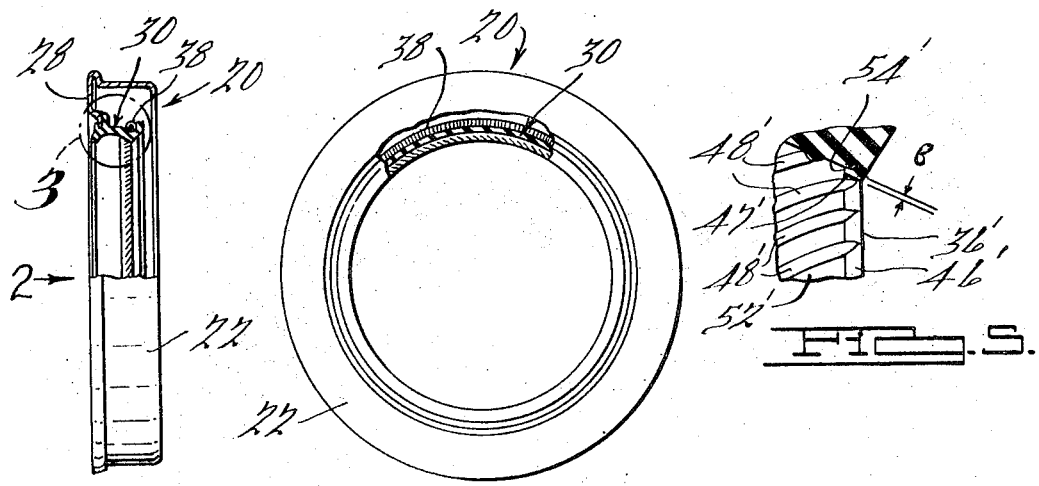
FIG. 1 is a view, partly in side elevational and partly in section, illustrating a seal according to the present invention.
FIG. 2 is an elevational view of the seal taken in the direction of the arrow "2" of FIG. 1.
FIG. 5 is a view generally similar to FIG. 4 but illustrating a variation in the orientation of the static lip.

As seen in FIG. 1 of the drawings, a seal 20 has an outer metal cup-shaped housing 22 adapted to be press fitted into a complimentary recess, (not shown) to effect a seal with a rotatable shaft 26. The housing 22 has an inward flange 28 to which a seal element 30 is supportingly anchored. As is conventional, the seal element 30 is molded around and bonded to flange 28. The seal element 30 is made of a resiliently distortable elastomeric material such as rubber or plastic. In the mechanism illustrated, seal 20 and element 30 are annular.

Seal element 30 has a sealing edge 36, as will be more particularly described, which is lightly urged into contact with shaft 26 by means of a helical garter spring 38 disposed within an annular groove 40. Seal element 30 may be provided with a lip 42 which engages shaft 26 at a location axially spaced from sealing edge 36 to exclude dirt and other foreign matter from the region of the sealing edge 36. Between the sealing edge 36 and lip 42 is a cavity 44 which may be filled with grease or other packing to provide lubricant for lip 42.

As the drawings are viewed, the oil side of the seal element 30 is to the right of sealing edge 36 while the air side is to the left of the sealing edge 36.

In accordance with the instant invention, seal element 30 is provided with an annular static lip 46 which has a radially inner conical face 47 that extends at an acute angle, relative to the central axis of the shaft 26, toward the shaft 26, progressing from the air side toward the oil side. The static lip 46 terminates at an apex which provides the annular sealing edge 36. Thus, a series of helically orientated raised fluid impellers 48, which extend across the static lip 46, blend thereinto so as to be contiguous with the sealing edge 36 when the seal 20 is operatively related with the shaft 26. In hydrodynamic seals heretofore known, the raised helical impellers extended through the sealing edge of the seal.

Figures 4, 6:
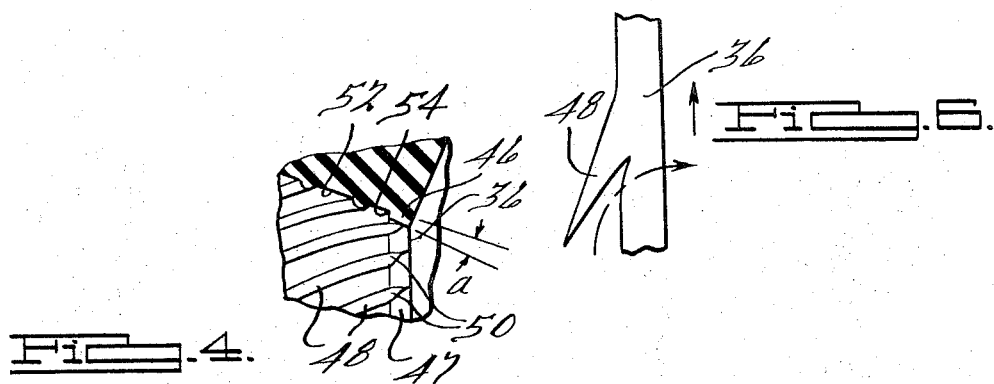
FIG. 4 is a fragmentary view generally on the scale of FIG. 3 illustrating the seal dismounted from the shaft.
FIG. 6 is a fragmentary diagrammatic flat development illustrating the region of contact between the sealing edge of the static lip and a shaft.

As best seen in FIG. 4, fluid impellers 48 have a generally uniform height with respect to a region 52 adjacent the static lip 46. It is to be noted that the region 52 slopes toward the shaft 26 at an acute angle which is less by an amount designated angle A relative to the central axis of the shaft 26, than the angle of the surface 47 of the static lip 46. Therefore, the fluid impellers 48 blend into the static lip 46 as they progress thereacross. In the seal of FIG. 4, static lip 46 is radially inwardly offset from region 52 by a step 54 which inhibits the passage of dirt particles toward the static lip 46.

In the seal element 30 illustrated in FIG. 5, the conical face 47' of the static lip 46' slopes at the same angle (b) toward the shaft as region 52'. Therefore, it is required that the impellers 48' be of increasing radial height as they extend away from sealing edge 36'.

Figure 3:
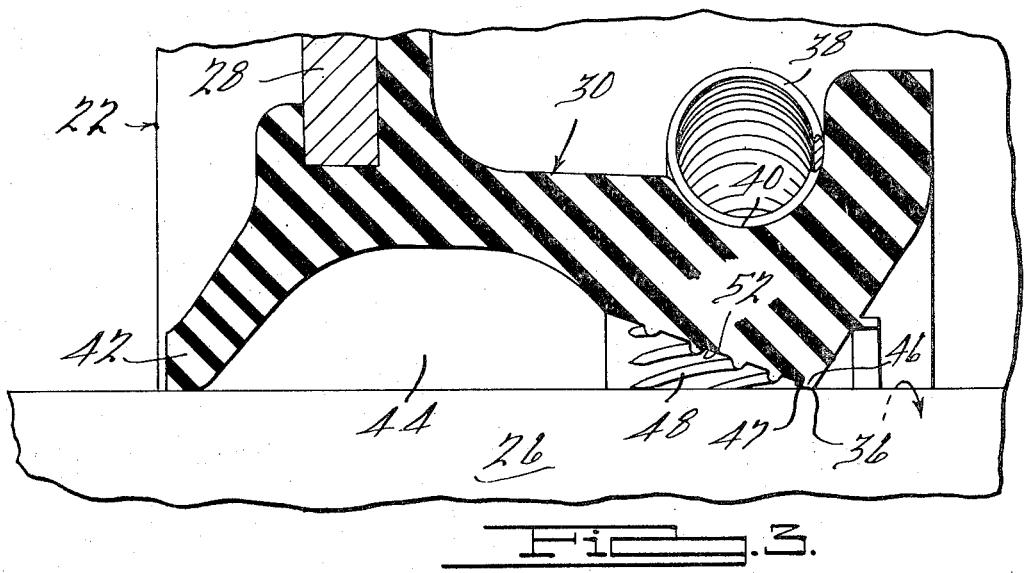
FIG. 3 is a fragmentary sectional view of an enlarged scale illustrating the subjected matter within the circle "3" of FIG. 2 and mounted around a shaft.

In use, the spring 38 urges the sealing edge 36 of the static lip 46 into contact with the shaft 26. The area of contact is illustrated in FIG. 6 and is preferably relatively narrow initially, for example, 0.002 to 0.005 inches wide, or, in other words, line contact. One of the features of the instant invention is that the constricting force of spring 38 can be relatively light, so that a thin film of oil is permitted to form between the shaft 26 and the area of contact of the sealing edge 36 illustrated in FIG. 6. This oil film forms the actual seal which functions to contain oil against leakage from the right side or oil side of the seal 20 to the left side, or air side, as seen in FIG. 3. Hydrodynamic seals heretofore known have required a relatively large spring force to compress the fluid impellers against the shaft in order to prevent static leakage. Alternatively, if a light spring was used in seals heretofore known, static leakage could be expected between the fluid impellers.

From FIG. 6, it will be seen that the region of contact of the impellers 48 with shaft 26 converges with the direction of rotation of the shaft 26. Any leakage oil moving toward the air side of the seal 20 will therefore be given an upward component of motion because of the direction of shaft rotation. Such oil will impinge upon the radial surface of impeller 48, hich deflects such oil back between the sealing edge 36 and the shaft 26. Dynamic leakage is thereby effectively prevented.

The aforesaid oil deflection or pumping is accomplished for the most part by the portions of the impellers 48 which are in contact with the shaft 26, but closely adjacent thereto, also provide some of the pumping action. The broken arrow in FIG. 6 indicates in general the direction of the pumping action.

The seal element 60 illustrated in FIGS. 7–9 is, in general, similar to seal element 30 except that instead of being stepped radially inwardly, a static lip 62 is angled more steeply in a shaftward direction than the adjacent portion 64. The static lip 62 terminates in an apex defining, when placed on a shaft, a sealing edge 66. Fluid impellers 68 have end portions 70 which intersect and extend across the static lip 62. Because of the stepper angle of the static lip 62, end portions 70 of the impellers 68 are of progressively decreasing radial dimension and terminate in contiguous relation to sealing edge 66 as shown.

When seal element 60 is mounted around a shaft, sealing edge 66 and the radially inner surfaces of the impellers 68 engage the shaft in an area of contact shown in FIG. 9. Impeller portions 70 function in the manner described above to pump leaked oil back between the sealing edge 66 and the shaft.

The seal element 80 shown in FIGS. 10–14 is provided with oil-deflecting fluid impellers 82, 84, angled in opposite directions and disposed in alternate arrangement. The impellers 82 and 84 are defined by triangular indentations 88. As shown in FIG. 10, the base of each triangular indentation 88 terminates in a static lip 86. Here again, the static lip 86 is slopped shaftward at a stepper angle than adjacent portions 88, with the result that impellers 82 and 84 are of progressively diminishing radial dimension across the static lip 86 as they approach a sealing edge 90. Each impeller terminates in close proximity to sealing edge 90 as shown.

When the seal element 80 is mounted around a shaft, sealing edge 90, and impeller portions 82, 84 engage the shaft in a region of contact illustrated in FIG. 14. When the shaft is rotated in one direction, for example, upwardly as in FIG. 14, fluid impeller 82 pumps leakage oil back under the sealing edge 90. When the shaft is rotated in the opposite direction, impeller 84 pumps any leakage back under the sealing edge 90. As in the forms of the invention discussed above, the portions of impellers 82, 84 in contact with the shaft provide most of the pumping action, but some of the pumping action is provided by portions of the barriers out of contact with the shaft but closely adjacent the regions of contact. The broken arrows in FIG. 14 indicate in general the directions of the pumping action.

The seal element 100 illustrated in FIG. 15 is similar to element 80 except that the alternately oppositely disposed fluid impellers 102 and 104 are defined by a raised triangular configuration which extends across a static lip 106 and meets at an apex 108 in close proximity to a sealing edge 110. Impellers 102 and 104 decrease in radial dimension as they progress across the static lip 106 because of the steeper angle of the static lip 106 than adjacent portions 112 of the seal element 100. When seal element 100 is mounted around a shaft, sealing edge 110, and impeller portions 102, 104 engage the shaft in a region of contact shown in FIG. 18. Depending on the direction of shaft rotation, impellers 102 or 104 function similarly to impellers 82 and 84 of FIG. 14, respectively, to pump leakage oil back under the sealing edge.

In each of the seal elements 30, 60, 80 and 100, the static lip defines one leg of a V-shaped configuration whose apex forms sealing edges 36, 66, 90 and 110, respectively. The material forming the seal element in each case must have adequate mass so that the static lip area will not disintegrate under the forces thereon incident to spring 38 and shaft rotation as well as be easily distortable to enable spring 38 to constrict it around the shaft. The amount of mass within the V can be varied by changing any one of several factors; but on the basis of present experience, it appears that the angle between the legs of the V should not be substantially less than 80°.

It is believed that each of the illustrated forms of the seal element will find the greatest usefulness where the angle between the static lip and its adjacent portion of the element is in the range from about 5° to about 30°. However, as pointed out above in the modification of FIG. 5, this angle may be zero if the impellers are tapered into the static lip.

The angle between the oil-deflecting fluid impellers in each of the modifications and the direction of shaft movement is preferably in the range from 10° to about 45°.

It is to be noted that with the present invention, the force of spring 38 can be relatively less than in conventional helical seal structures not having a static lip. This facilitates formation of the sealing film of oil and reduces the extent to which the spring pressure tends to disrupt the oil film. Moreover, wear on the sealing element is reduced and the effective life of the seal element is increased.

While it will be apparent that the exemplary embodiment illustrated herein is well calculated to fulfill the objects above stated, it will be appreciated that the seal of the present invention is susceptible to modification, variation and change without departing from the proper scope or fair meaning of the subjoined claims.

What is claimed is:

1. In a seal comprising an element having a plurality of fluid impellers for precluding leakage of a fluid between relatively rotatable members under dynamic conditions,
   the improvement comprising a generally conical static lip on said element terminating in a smooth sealing edge engageable with one of said members in uninterrupted line contact, said fluid impellers extending across said static lip into contiguity with said sealing edge when said seal is in operative relationship with said members, said element having a region adjacent said static lip which extends shaftward at an angle, the shaftward angle of said static lip being steeper than that of said adjacent region by an amount in the range from about 5° to about 30°, said fluid impellers extending across the boundary between said static lip and adjacent region, said impellers having a generally uniform height with respect to said adjacent region, said impellers having progressively diminishing height across said static lip, said static lip forming one leg of a portion of said element having a generally V-shaped section, the apex of the V providing said sealing edge, the angle between the legs of the V being not substantially less than 80°.

2. The seal defined in claim 1 wherein said element has a region adjacent said static lip which extends shaftward at an acute angle, said element being configured to define a radial shoulder between said static lip and adjacent region, said fluid impellers intersecting said shoulder.

* * * * *

UNITED STATES PATENT OFFICE
CERTIFICATE OF CORRECTION

Patent No. 3,785,660     Dated January 15, 1974

Inventor(s) Jack A. Bush

It is certified that error appears in the above-identified patent and that said Letters Patent are hereby corrected as shown below:

Column 3, line 20, "hich" should read -- which --.
Line 25, after "shaft 26" the comma "(,)" should be canceled, and -- . However, portions of the impellers 48 out of contact with the shaft 26, -- should be inserted.
Line 37, "stepper" should be -- steeper --; line 54, "stepper" should read -- steeper --; line 53, "slopped" should read -- sloped --.

Signed and sealed this 3rd day of September 1974.

(SEAL)
Attest:

McCOY M. GIBSON, JR.
Attesting Officer

C. MARSHALL Dann
Commissioner of Patents